May 17, 1966 P. C. FISH 3,251,912
METHOD FOR MAKING AN INSULATING JOINT
Filed March 11, 1963 2 Sheets-Sheet 1
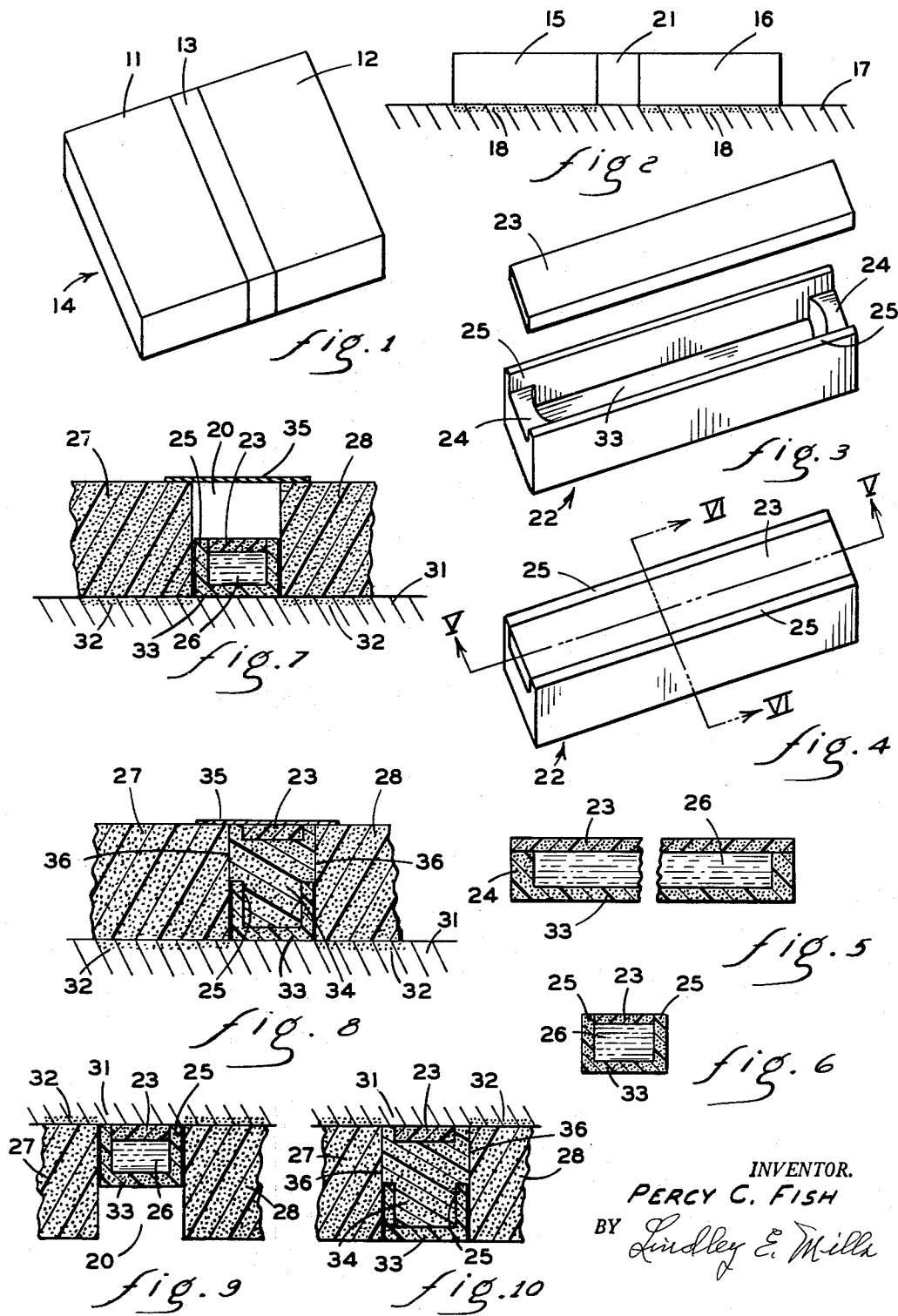
INVENTOR.
PERCY C. FISH
BY Lindley E. Mills May 17, 1966  P. C. FISH  3,251,912
METHOD FOR MAKING AN INSULATING JOINT
Filed March 11, 1963  2 Sheets-Sheet 2
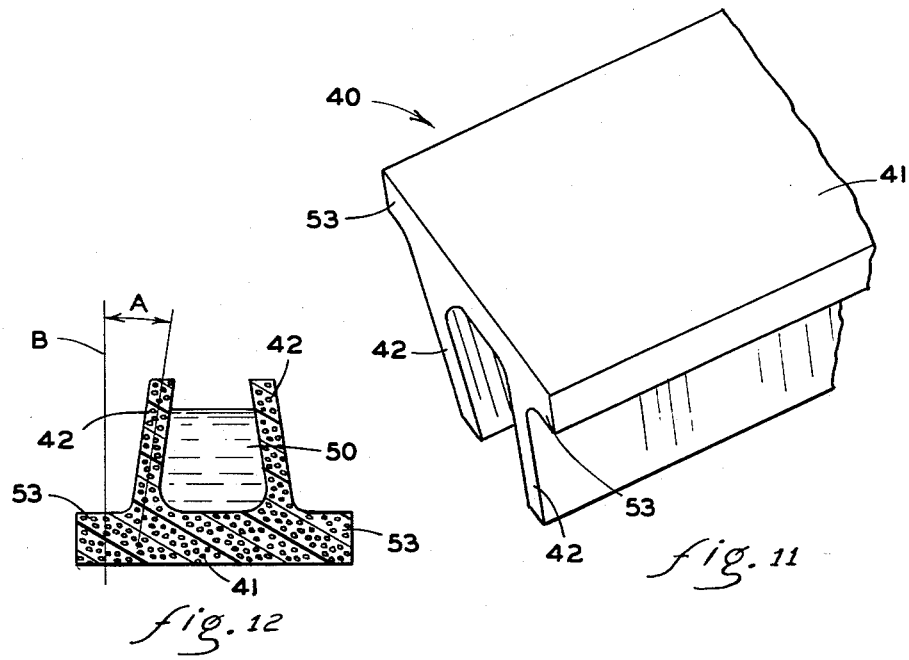
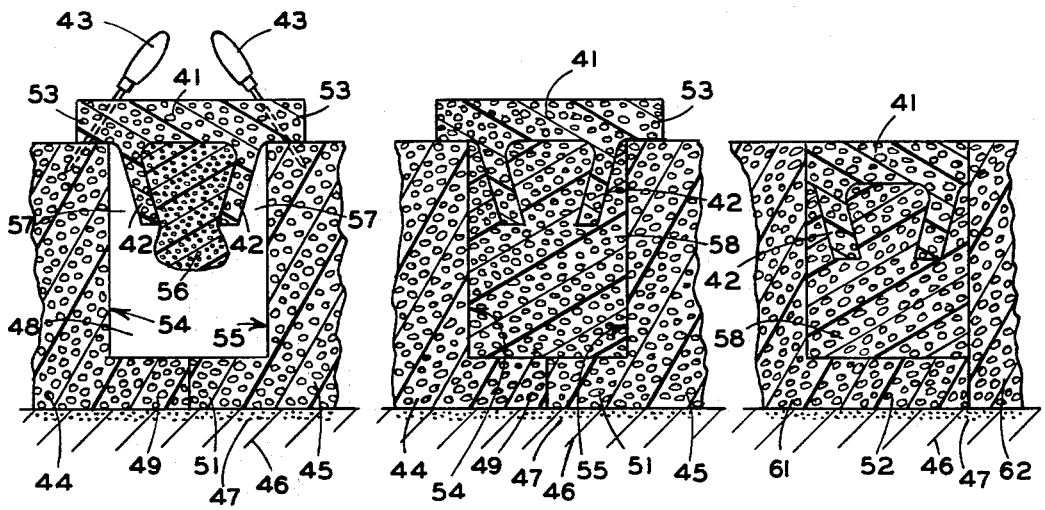
INVENTOR.
PERCY C. FISH
BY

United States Patent Office 3,251,912
Patented May 17, 1966

3,251,912
METHOD FOR MAKING AN INSULATING JOINT
Percy C. Fish, Kalamazoo, Mich., assignor to The Dow Chemical Company, Midland, Mich., a corporation of Delaware
Filed Mar. 11, 1963, Ser. No. 265,586
11 Claims. (Cl. 264—45)

This application is a continuation-in-part of application Serial No. 157,224, filed December 5, 1961 and now abandoned. This application relates to a method for joining heat insulating elements, particularly to a method for joining heat insulating elements to provide a strong, rigid structure having high heat insulating properties across the region of the joint, and to the joined structure thus produced.

The use of foamed or expanded resinous compositions for heat insulating purposes has become widespread. It is generally the custom when a surface is to be insulated with an expanded synthetic resinous composition to first form the composition into insulating elements of convenient size and configuration and to then apply these elements to the surface to be insulated. Such elements are often cut from a larger mass of the expanded composition so as to prepare them in relatively accurately dimensioned form, although insofar as the present invention is concerned they can be prepared in any convenient way. Such elements conventionally comprise expanded polystyrene, expanded polyurethane compositions, expanded polyolefin compositions, and other compositions. They are often formed as relatively large slabs, boards or blocks and utilized in this form.

The utilization of preformed insulating elements of expanded synthetic resinous compositions for insulating purposes presents certain difficulties which have not heretofore been overcome. Such elements are frequently applied to a wall or other surface which is to be insulated by bonding them to the surface with a suitable adhesive. It is also sometimes the practice to use a conventional adhesive for joning the elements to one another but this procedure is not entirely satisfactory because it leaves a layer of the hardened adhesive extending all the way through the insulating layer. When this is done, the adhesive layer, since it is of higher heat conductively than the insulating elements themselves, furnishes a pathway of relatively high heat conductivity through the finished insulating layer through which considerable heat loss may occur in the case of insulated structures maintained at an elevated temperature. In the case of insulated cold rooms, it is not uncommon when the elements are cemented together in this way for the exterior surface of the insulating layer to be covered with a network of lines of frost coinciding with the network of joints formed with the conventional adhesive. In addition, it is difficult to form insulating elements of the type referred to which are dimensioned with sufficient accuracy to avoid spaces between at least some of the elements which are wider than is desirable when conventional adhesives are employed.

Certain of the foregoing difficulties inherent in the use of conventional adhesives are often overcome by deliberately spacing the insulating elements at a suitable distance from one another and subsequently depositing a foam-forming synthetic resinous adhesive composition in the groove or channel between the facing surfaces of the positioned preformed insulating elements. Thus it is sometimes the practice in insulating a wall to secure a series of insulating panels to the wall surface, e.g. by means of an adhesive or in any other convenient way, leaving a space or channel of suitable width between adjacent elements. A suitable foam-forming resinous adhesive composition is then distributed, as by spraying, on the facing surfaces of the panels and allowed to foam and harden. The amount of adhesive employed is generally sufficient to fill entirely the channel between the panels. As a practical matter it is difficult to gauge with any particular degree of accuracy the amount of adhesive which should be employed to just fill the space with the foamed and hardened composition and it is, therefore, generally the practice to use somewhat of an excess of the adhesive composition and to eventually trim away the excess of foamed composition which protrudes as an irregular mass past the outer surface of the insulating elements to form a fairly smooth surface across the region of the joint. This, of course, results in considerable wastage of the adhesive composition since the portion trimmed away cannot be used over again. One such method is disclosed and claimed in co-pending application Serial No. 553,665, filed December 16, 1955, now U.S. Patent No. 3,106,751.

Although methods such as that just referred to for joining expanded resinous insulating elements using a foam-resinous adhesive composition have the advantage over methods employing nonfoam-forming adhesive compositions in that the region across the joint is devoid of pathways of low heat insulating value, the method as heretofore carried out presents certain inherent disadvantages.

In addition to the wastage of adhesive composition to, it is also pointed out that, to be able to introduce a foam-forming adhesive into the space between adjacent insulating elements, it is necessary that the space be left wide enough to accommodate the head of a spray gun or to allow the introduction of other apparatus which may be employed in distributing the unfoamed, usually very viscous, foam-forming adhesive composition. For best results it is generally necessary that adjacent insulating elements be spaced from one to another by a distance of from one to three inches, or even further. When an especially thick insulating layer is to be applied to a structure, it is even often necessary, to avoid leaving too wide a space between the insulating elements, to build up the insulating layer using two or more superposed layers of insulating elements with the elements of each layer being secured, as by a conventional adhesive, to the layer of elements beneath it. This, of course, adds considerably to the labor and materials costs of the installation. Since the foam-forming resinous adhesive compositions are generally much more costly per unit of volume of foamed composition formed than are the preformed insulating elements themselves on a similar unit basis, it is clear that the cost of the foam-forming adhesive composition alone is a principal item in the total cost of the insulating operation. When the spaces between adjacent insulating elements are too wide, either by reason of choice or necessity, it is equally clear that the cost of the foam-forming adhesive composition itself can render the entire procedure uneconomical.

Additionally, it is important to note that, although the foam-forming adhesive compositions referred to are generally in the form of quite viscous liquids, they are, nevertheless, flowable until they have foamed and reacted sufficiently to become at least semi-rigid and that during this time considerable flowing of the composition downward along vertical surfaces and even a certain amount of dripping from overhead surfaces is prone to occur before the composition has hardened enough to prevent this. The components of such compositions must generally be mixed immediately prior to use and it is apparent that they must be formulated so that they will not foam and harden too fast to allow sufficient time for the mixed composition to be applied before it hardens appreciably. It is common practice to mix small batches of adhesive composition and to then use it immediately or, sometimes, to employ apparatus which mixes the components of the composition as it is applied; but even these procedures do not eliminate the sagging and dripping effect referred to.

The net result is that in joining insulating elements on a vertical wall it is almost impossible employing hitherto known procedures, unless a large excess of adhesive composition is used, to avoid a condition where a considerable amount of the foamed composition protrudes from the lower end of the space or channel between adjacent insulating elements and must be trimmed away while the upper parts of the channel may not be filled entirely with the foamed composition due to the downward flow of the still liquid composition just mentioned. When the insulating elements are on an overhead surface, it is difficut, if not impossible, to cause the foaming adhesive composition to expand upward and fill the channel between the elements completely to the surface to which the elements are secured unless the part of the surface itself which is exposed between the adjacent elements be coated liberally with the liquid composition. It is clear that this is a difficult operation to carry out and it is equally clear that if the space between adjacent insulating elements is not filled entirely with the foamed adhesive composition a pathway of low heat insulation between adjacent elements and a weak joint will result.

An additional disadvantage of procedures involving the deposition of a foam-forming resinous adhesive by spraying techniques arises from the toxicity to humans of the compositions generally used. This necessitates the wearing of suitable masks and protective clothing by the operator which, of course, renders the procedure highly undesirable. Furthermore, the difficulties pointed out are enhanced greatly when the procedures referred to are carried out in cold or cool weather. It is known that the reaction rates of the components of the composition with one another, and the rate of foaming of the composition, decrease rapidly with a decrease in the temperature of the composition. For this reason it is not generally considered practical to undertake the procedures referred to in cool or cold weather. Even if the procedure is carried out in cold weather, the smaller volume of foamed composition produced per unit weight, or volume, of the unfoamed composition renders the amount of the composition which must be used so excessive that the cost becomes essentially prohibitive. Even though the components of the composition be warmed before mixing, the contact of the composition with cold, noninsulating surfaces chills it so rapidly that any advantage accruing to the warming operation is virtually counteracted. Poor adhesion to such a chilled surface is often encountered.

For these and other reasons the method of insulating structures using preformed elements or panels of expanded resinous compositions and using a synthetic foam-forming, resinous adhesive composition to bond the elements to one another and provide regions of high insulating value extending across the joints has not attained the usage which the value of such an insulating joint merits. It is clear that any improvement which would overcome at least some of the foregoing difficulties would be of considerable value.

According to the present invention most of the foregoing difficulties are overcome by the method which will be described. Employing the method it is possible to bond or join insulating elements to one another easily and economically with the production of a strong joint which is entirely devoid of any pathway of relatively high heat conductivity through the region of the joint. The process can be carried out even when joining vertically extending surfaces of the insulating elements and also when the elements are located overhead, as on a ceiling, with the production of a desirably smooth surface across the region of the joint which requires little or no trimming away and wastage of protruding excess hardened adhesive. The spraying of an adhesive into the channel between the facing surfaces of adjacent insulating elements is avoided entirely. It is, therefore, usually possible to leave less space between adjacent insulating elements when employing the process of this invention than is usually necessary when employing spraying techniques. This reduces considerably the amount of foam-forming resinous adhesive composition which must be employed to fill the channels between the elements with a corresponding reduction in the cost of effecting the joining of the elements.

Furthermore, as will be shown, a considerable proportion of the space between adjacent insulating elements is occupied in the finished joint by a preformed structure made of an expanded resinous composition. This structure, which may be made of a relatively inexpensive composition, reduces still further the amount of costly foam-forming resinous adhesive composition which need be employed over that which would have to be employed if the preformed structure were not used. Any tendency of the foam-forming composition to drip or flow before hardening has commenced is overcome essentially entirely and the procedure can be carried out conveniently in cold weather. In addition, since the deposition of the foam-forming adhesive by spray means is avoided, the necessity of using two or more layers of superposed insulating elements to build up a thick insulating layer is avoided and this decreases further the cost of the bonding operation. Insulating elements in the form of panels 4 to 8 inches thick can, for example, be secured on a vertical or overhead wall surface with suitable, but not unduly wide, spaces left between adjacent elements and the elements then bonded together securely using the method of the invention to form a continuous bonded structure of uniform thickness and of high insulating value across the region of the joint or bond. As will also be seen, a considerable saving in labor and equipment cost is afforded by the method of this invention as compared with heretofore known methods for bonding together expanded resinous insulating elements using foam-forming resinous adhesive compositions. The exposure of the operator to the toxicity hazards inherent in spraying a foam-forming resinous adhesive composition and the need for wearing cumbersome protective clothing are also avoided.

Briefly, the method of the present invention comprises first positioning a plurality of expanded resinous insulating elements, e.g. by cementing them to a wall or other rigid surface which is to be insulated or by locating them, as in a suitably dimensioned form, so that their facing surfaces which are to be bonded to one another are separated from one aonther by a suitable distance, e.g. by a distance of ½ inch or more, to form an open-sided channel between them and so that movement of the adjacent elements laterally with respect to one another during the bonding operation is essentially prevented. An elongated element, herein for want of a better term referred to as a "capsule," which is a troughlike structure of suitable configuration and dimensions, which will be described later, is then provided as a preformed article, the capsule being made of an expanded synthetic resinous composition or of other material of high heat insulating value. The capsule is loaded or charged with synthetic foam-forming, hardenable, resinous adhesive composition which is to be employed in making the joint by distributing the composition along the length of the trough or cavity in the capsule. The charged capsule is then inserted into the space or channel between the insulating elements so that it extends longitudinally therein. Preferably the adhesive composition is allowed to undergo some initial foaming action before the capsule is inserted into the channel to reduce any tendency of the composition to flow longitudinally in the capsule. This is often of some importance when the capsule is inserted into a vertically extending channel. Depending upon its configuration and dimensions with respect to the dimensions of the channel, the capsule can be inserted partially or completely into the channel.

Following the placing of the capsule in the channel between the insulating elements, the assemblage is left undisturbed until the foaming action is complete, and the foamed adhesive has hardened and set. When sufficient of the foam-forming adhesive composition is used, it is found that after the foaming action is completed the part of the channel unoccupied by the parts of the capsule inserted into the channel is filled essentially completely with the foamed and hardened adhesive and that the insulating elements, the inserted parts of the capsule and the hardened adhesive are all bonded firmly together to form a rigid continuous layer of high heat insulating value extending entirely across the region of the joint. The joint is strong and entirely free of paths of high heat conductivity through it and free of the disadvantages occasioned by such paths.

The preformed capsule can assume any satisfactory confiduration, a number of which are described later herein. In some instances the capsule can comprise a cavity-containing capsule body with a capsule cover which becomes displaced from the capsule body during the foaming of the adhesive. In other instances no cover for the capsule body is employed. Also, when desired or preferred, the capsule can be provided with one of its elements wider than the channel so that the element itself cannot be inserted into the channel but remains as a striplike member outside the channel covering the finished joint.

It is known that the synthetic, foam-forming, hardenable resinous adhesive compositions employed in carrying out the method of this invention generally foam exothermally and that the development of a somewhat elevated temperature within the body of foaming material because of this exothermic action leads to more rapid foaming action and to a more uniformly foamed product. The contacting of a surface of the foaming body with a chilled surface of a heat conducting article will frequently decrease the rate and degree of foaming of the surface and adjacent layers of the body considerably and may even lower the degree of adhesion of the foamed composition to the surface. In carrying out the method of this invention in certain instances, e.g. in the insulation of a wall surface, during cold weather it is frequently desirable for the foregoing reasons to avoid as far as possible the contacting of the foaming composition with a noninsulating surface at the bottom of the channel between the insulating elements being joined. As will be shown, this effect can be accomplished in a number of ways. In certain instances the capsule can be formed and inserted into the channel in such a way that it forms an insulating layer between the foaming adhesive and the noninsulating surface. In other instances the insulating elements are formed, as by rabbeting, so that the channel is of less depth than the thickness of the elements, thus leaving abutting portions of the elements forming an insulating bottom for the channel. These and other features will be apparent as the description proceeds.

The invention can be understood readily by reference to the accompanying drawing wherein, in the interest of clarity, certain features are shown on a somewhat exaggerated scale and wherein:

FIGURE 1 is an oblique view, somewhat schematic in nature, of an insulating panel formed by joining two smaller panels and embodying features of the invention;

FIGURE 2 is a side elevation, also somewhat schematic, of a pair of insulating panels each bonded to a flat surface and joined to one another employing the method of the invention;

FIGURE 3 is an exploded oblique elevation showing one modification of a capsule comprising a capsule body and cover useful in carrying out the method of the invention;

FIGURE 4 is an oblique elevation of the capsule body and cover of FIGURE 3 with the cover seated;

FIGUREE 5 is a side elevation taken along the line V—V of FIGURE 4 showing the location of a foam-forming resinous adhesive composition in the charged capsule;

FIGURE 6 is a sectional elevation taken along the line VI—VI of FIGURE 4 and also showing the location of a foam-forming resinous adhesive composition in the charged capsule;

FIGURE 7 is a sectional elevation of a pair of insulating panels secured to a flat surface with an adhesive showing one possible location of the charged capsule of FIGURES 5 and 6 in a channel between the panels prior to foaming of a foam-forming resinous adhesive composition contained in the capsule;

FIGURE 8 is a sectional elevation corresponding to FIGURE 7 but showing the locations of the parts in the finished bond or joint after the foam-forming adhesive has foamed and hardened;

FIGURE 9 is a sectional elevation of a pair of insulating panels secured to a flat surface with an adhesive showing another possible location of a charged capsule similar to the capsule of FIGURES 5 and 6 in a channel between the panels prior to foaming of a foam-forming resinous adhesive composition contained in the capsule;

FIGURE 10 is a sectional elevation corresponding to FIGURE 9 but showing the location of the parts in the finished bond or joint after the foam-forming adhesive has foamed and hardened;

FIGURE 11 is an oblique view of an alternate form of capsule comprising a capsule body without a cover useful in carrying out the method of the invention;

FIGURE 12 is a sectional transverse elevation of the capsule of FIGURE 11 showing the capsule inverted and charged with a quantity of a foam-forming adhesive;

FIGURE 13 is an elevation showing the capsule of FIGURES 11 and 12 as sometimes used in forming an insulating joint and showing a foam-forming adhesive composition in an intermediate stage of the foaming action;

FIGURE 14 is a sectional elevation corresponding to FIGURE 13 but showing the finished joint after the foaming action of the adhesive has been completed; and FIGURE 15 is a sectional elevation of a finished joint corresponding to the joint of FIGURE 14 but showing an alternate arrangement of certain of the parts.

Referring to FIGURE 1, there is shown schematically an insulating panel 14 which can be formed according to the method of the invention from a pair of smaller panels 11 and 12. The large panel 14 consists of the two smaller panels 11 and 12 separated by a suitable distance from one another with the space between them being filled with a body 13 formed in part of a preformed expanded resinous structure, not shown in FIGURE 1 but which will be referred to in detail later, and in part of a foamed resinous adhesive composition which extends between and is bonded to the elements 11 and 12 as well as to the preformed structure. The particular way in which the bonding operation is carried out will be apparent as the description proceeds. Although the structure illustrated at 14 of FIGURE 1 is made from only two preformed insulating panels 11 and 12, it is clear that any number of preformed panels or elements can be employed with each panel being bonded to each adjacent panel by an insulating material corresponding to that illustrated at 13.

In FIGURE 2 there is shown, also somewhat schematically and in general fashion, an insulated wall surface which can be formed employing the method of the invention. Here a pair of panels 15 and 16, spaced at a suitable distance from one another, are secured by an adhesive 18 to the surface of a wall or other base structure or element 17. The channel between the panels 15 and 16 is filled in part with a preformed insulating structure and in part with a foamed resinous adhesive composition, as in FIGURE 1, the foamed composition being bonded securely to each of the elements 15 and 16 and to the preformed structure, there thus being formed a continuous insulating layer across the region of the joint as illustrated at 21.

It is to be noted that in the case of the panel 14 of FIGURE 1 which is not secured to a wall surface it is convenient to provide a traylike frame, with side walls, not shown, of suitable dimensions in one end of which the panel 11 can be retained and in the other end of which the panel 12 can be retained with a suitable distance separating the facing sides of the panels and with the walls of the tray securing the panels against movement away from one another to guard against the space between them becoming wider as the method is carried out. Alternatively, the panels 11 and 12 can be set on a flat surface in properly spaced arrangement and then merely weighted down to hold them in their properly spaced relationship until the joint is formed.

In forming the joint of this invention, such as those illustrated schematically at 13 and 21 of FIGURES 1 and 2, respectively, there is first provided a suitable preformed structure or capsule, one form of which is illustrated in FIGURES 3 and 4. The capsule can assume any one of a number of other convenient forms, some of which will be described later, provided it can function as will be described. The capsule of FIGURES 3 and 4 comprises a troughlike capsule body 22 with integral closures 24 at both ends. The body 22 is formed with a trough bottom wall member 33 and a pair of upstanding trough side wall members 25 formed integral with the member 33 which extend for a convenient distance above the end closures 24. A cover 23 is provided which conveniently has a thickness approximately equal to the height of the side walls 25 above the end closures 24. When the cover is seated on the capsule body as illustrated in FIGURE 4, it is retained frictionally between the members 25 and, since it rests on the end closures 24 there is defined within the capsule a cavity of any suitable predetermined capacity. The capsule of FIGURES 3 and 4 is preferably made of any suitable expanded resinous composition which is a good heat insulator. However, it can be made of any other suitable material provided the heat conductivity of the material is low enough to provide a final joint which has a desired degree of heat insulation. In general, because of cost considerations, it is convenient to make the capsule from expanded polystyrene, either by molding or by cutting and routing operations in ways which will be apparent without further description.

The construction of the particular capsule shown in FIGURES 3 and 4 will be further apparent from FIGURES 5 and 6. In FIGURES 5 and 6 there is also shown a synthetic foam-forming, resinous adhesive composition 26 in the closed charged capsule ready to begin foaming and expanding. It is, therefore, convenient to dimension the cavity in the capsule so that the amount of foam-forming adhesive composition required to make the joint in which the capsule is to be used fills the troughlike cavity in the capsule to approximately the level of the tops of the end closures 24. This amount of adhesive composition can be poured quickly and with considerable accuracy into the body of the open capsule and the cover then installed immediately so that the capsule is ready for use. The foam-forming adhesive composition can, of course, be charged into the capsule using any desired procedure.

One manner of using the filled or charged capsule of FIGURES 5 and 6 is illustrated in FIGURES 7 and 8. Here a pair of insulating elements 27 and 28 are secured to a wall surface 31 by any suitable conventional adhesive 32. The facing surfaces of the elements 27 and 28 are separated from one another by a distance which is approximately the same as that of the width of the charged capsule which is to be used, i.e. approximately the same as the distance between the outer surfaces of the side walls 25. In the event the joint is to extend vertically or is to be an overhead joint, the distance between the surfaces of the elements 27 and 28 and the width of the capsule can conveniently be related to provide a friction fit of the capsule between the elements 27 and 28 to keep the charged capsule firmly in place in the channel between the elements 27 and 28, at least until foaming of the adhesive composition begins.

The charged capsule is then inserted longitudinally into the channel between the elements 27 and 28. In the modification of FIGURES 7 and 8 the capsule is inserted into the channel with its cover 23 facing the open side of the channel. The capsule is pushed into the channel as shown in FIGURE 7 until its bottom wall 33 rests on the surface of the wall structure 31. In the illustration given the capsule is unsecured to the surface of the wall 31 although, if desired, the wall surface exposed between the elements 27 and 28 can be coated or brushed with a conventional adhesive prior to the insertion of the capsule. In the modification illustrated in FIGURE 7 the open side, or top, of the channel between the insulating elements 27 and 28 is covered with an element 35 which, as noted previously, can be a sufficiently wide strip of strippable adhesive tape which is secured along its edges to the elements 27 and 28 or it can be a decorative strip of any suitable material which is intended to be left in place. In the event a plurality of charged capsules are employed in forming a single elongated joint, they are inserted into the channel in end to end relationship, it being apparent that the adhesive foaming from the end of one capsule will expand into contact with, and become bonded to, the adhesive foaming from the adjacent end of the next adjacent charged capsule. The entire joint thus becomes an integral structure along its entire length.

Following the insertion of the capsule into the channel, and the affixing of the element 35, if such an element is employed, the assemblage is left undisturbed until the foam-forming adhesive 26 has foamed and filled the channel with the hardened foam adhesive composition as illustrated at 34 of FIGURE 8. Here it will be noted that during the foaming of the adhesive the capsule cover 23 is displaced from the body of the capsule and that the foaming adhesive expands in volume and fills the channel between the elements 27 and 28 essentially completely except for the space occupied by the cover 23 and the capsule body. The capsule cover 23 remains within the channel embedded in or surrounded by the foamed adhesive. Using the proper amount of foam-forming adhesive composition, the element 35 serves effectively to restrain the foaming adhesive from protruding from the channel during the latter stages of the foaming action. In the event the element 35 is a strippable tape, it can eventually be stripped from the completed joint leaving an essentially planar surface across the region of the joint. In the event the element 35 is a decorative panel, it is apparent that the foamed adhesive coming into contact with a sizeable proportion of its under surface will become bonded to it and assist in retaining it in its proper position.

Bonding of the foamed adhesive to the elements 27 and 28 occurs wherever the foaming adhesive comes into contact with the surfaces of the elements. Generally, the surfaces of the elements which become thus bonded by way of the foamed and hardened adhesive are the portions of the surfaces extending between the limits of the members 25 of the capsule body and the element 35. With properly proportioned parts this is adequate to furnish a strong rigid joint even though the entire surfaces of the elements 27 and 28 which face one another may not be bonded to the intermediate hardened adhesive composition 34. It will also be noted that the channel between the elements 27 and 28 is completely filled with insulating material which consists, in part, of the capsule body and the capsule cover and, in part, of the foamed hardened resinous adhesive composition. It will, of course, be apparent that the element 35 can be omitted in carrying out the process, if desired, and that if any of the foamed resinous adhesive 34 does protrude from the channel beyond the plane of the outer surfaces of the elements 27 and 28 it can, if desired, be trimmed away as heretofore practiced.

It will be observed that one important feature of the modification of the invention just disclosed is the possibility of constructing the capsule with a cavity which has a capacity adapted to contain with considerable accuracy the amount of foam-forming adhesive which will be required to complete filling of the channel between the insulating elements and thus to produce a joint of high insulating value but without the wastage of more than a very small proportion, usually none at all, of the foam-forming adhesive composition. Furthermore, this effect can be accomplished to leave an essentially planar exposed surface of the insulating layer across the region of the joint without trimming. It should be mentioned, however, that it is not essential that the cavity in the capsule be small enough to hold only the required amount of foam-forming composition since the cavity may be only partially filled with the composition. It is also apparent that, since in any particular instance it is desirable that the foam-forming composition be distributed in the capsule as evenly as conveniently possible along its length, the filling operation is well suited to being carried out by automatic means.

The bond may be effected with the capsule of FIGURES 3 and 4 using variations of the foregoing procedure. In contrast to the procedure described in connection with FIGURES 7 and 8, it is often convenient and sometimes preferable to proceed in the manner illustrated in FIGURES 9 and 10. In this instance the charged capsule is inserted into the channel 20 so that the cover 23 is in contact with the exposed sections of the structure 31 between the insulating elements 27 and 28. Upon subsequent foaming of the foam-forming adhesive 26, the pressure generated forces the body of the capsule outward of the channel until it assumes the position shown in FIGURE 10 wherein the surface of its bottom wall is essentially coplanar with the outer surfaces of the elements 27 and 28. Here again an element, corresponding to the element 35 of FIGURES 7 and 8, can, if desired, be employed to cover the open side of the channel before the foam-forming adhesive has foamed completely. Any protuberance of the bottom wall 33 of the capsule beyond the plane of the adjacent outer surfaces of the elements 27 and 28 can thus be essentially prevented. Should, however, such an element not be employed, or should it become necessary for any reason to trim the joint, the necessary portion of the capsule can be trimmed away easily. When this modification is employed, it will be noted that moderate pressure on the foaming adhesive can be maintained throughout the entire period of foaming provided the side walls of the capsule body engage the walls of the elements 27 and 28 frictionally. This is often advantageous.

It will also be noted that in the modification of FIGURES 7 and 8 there is generally little sealing effected of the side and bottom walls 25 and 33 of the capsule body to the walls of the elements 27 and 28. This is sometimes of slight disadvantage when a problem of vapor sealing of the structure being insulated is encountered. Under such circumstances, small amounts of vapor may eventually penetrate the structure 31 and collect in the unsealed regions around the outside of the capsule body. When the modification of FIGURES 9 and 10 is employed, any such difficulty is avoided entirely since in this case the seals 36 extend clear to the surface of the structure 31. The modification of FIGURES 9 and 10 is also somewhat better adapted to the forming of overhead horizontal bonds, e.g., on the underside of a ceiling, than is the modification of FIGURES 7 and 8.

The capsule illustrated generally at 40 in FIGURE 11 is sometimes preferred in carrying out the method of the invention. This modification consists of a capsule body member comprising an elongated, plate like trough bottom member 41 and a pair of trough side members 42. This capsule body is ordinarily used without a capsule cover and is generally formed without end closures of the trough. The capsule body consisting of the members 41 and 42 is formed as an integral structure and is made from a material, preferably an expanded resinous composition, having good heat-insulating properties. The structure can be formed in any desired manner, as by expanding an expandable resinous composition in a mold or by cutting the structure from a block of expanded resinous composition by conventional hot-wire procedures. The two trough side members 42 project from the trough bottom member 41 on the same side thereof and each of the members 42 converges away from the bottom member 41 toward the other trough side member at an angle A, of FIGURE 12, with respect to a plane B drawn normal to the surface of the trough bottom member 41. In most instances the angle A conveniently has a value between about 5° and about 25°. The purpose of this particular convergent configuration of the trough side members 42 will be apparent as the description proceeds. It will be noted, also, that the convergent trough side members 42 are so located and dimensioned that their projecting edges are separated from one another by a suitable distance through which a foam-forming adhesive can be introduced into the trough between the side members and through which the adhesive can expand outwardly of the trough during the subsequent foaming action. The capsule of FIGURE 11 is charged by distributing a synthetic foam-forming, hardenable, resinous adhesive composition relatively evenly therein, as shown at 50 of FIGURE 12.

The manner of using the capsule of FIGURES 11 and 12 is illustrated in FIGURES 13 and 14. In the latter figures a pair of insulating elements 44 and 45 are shown secured in any convenient manner, as by a conventional adhesive 47, to the surface of a wall represented schematically at 46. Although the insulating elements 44 and 45 can be formed with plane facing surfaces and positioned to leave a channel of suitable width between them which extends to and is closed on one side by the surface of the wall 46, in a manner similar to that illustrated in FIGURES 7–10, it is often convenient, and usually preferred, to rabbet the adjacent edges of the elements 44 and 45, as illustrated in FIGURES 13 and 14, to leave sections 49 and 51 of the elements 44 and 45, respectively, which extend across the bottom of the channel 48 between the facing surfaces 54 and 55 and abut one another thus forming an insulating layer between the channel 48 and the surface of the wall 46. As the foam-forming adhesive foams in the channel 48 in the way which will be described, it is prevented by the sections 49 and 51 from coming into contact with the wall surface 46 which, if it is a chilled surface, may, as indicated previously, interfere seriously with the rate and uniformity of the foaming action and may even interfere to some extent with the adherence of the foam-forming adhesive to the surface.

Following the charging of the capsule with the foam-forming adhesive as shown in FIGURE 12, the charged capsule is inserted partially into the channel 48. It will be noticed that in this particular instance the channel bottom member 41 is wider than the channel 48 and that the edge sections 53 of the member 41 overlap the elements 44 and 45. In this instance therefore, only the trough side members 42 and the foam-forming adhesive retained between them is inserted into the channel 48 with the member 41 remaining outside the channel proper, but with the sections 53 in face-to-face contact with the outer surfaces of the elements 44 and 45. The member 41 thus serves as a cover for the open side of the channel and can remain in the finished structure to serve as a decorative strip covering the region of the joint.

It is, of course, sometimes desirable to form joints in a ceiling, in which instance the open side of the trough between the members 42 will be upward when the capsule is inserted into the channel 48. In other instances where the joints extend vertically, the capsule itself will extend vertically when it is inserted in the channel 48 in the way described. Also, should it be desired to form a joint in the insulating flooring of an enclosure such as a room, it will be apparent that following the insertion of the capsule, the open side of the trough will be downward. In the latter two instances, particularly, it is frequently advisable to allow the foaming action of the adhesive to proceed to some degree before the capsule is inserted into the channel. Such initial foaming of the adhesive causes it to thicken considerably and to become more viscous and less flowable, and eliminates essentially entirely any tendency for the adhesive to flow downwardly in the capsule in the case of a vertical joint or to drip from the capsule in the case of a floor joint. Most of the foam-forming adhesives which are employed commercially are quite viscous and the foaming action begins almost immediately after the ingredients of the adhesive are mixed and proceeds relatively rapidly, to the complete foaming action usually being completed in a matter of a few minutes. Thus very little time is lost on the part of the operator by allowing a certain amount of the foaming action to occur before the capsule is inserted into the channel and, as a matter of fact, it is difficult to load the capsule and insert it into the channel before a small but significant amount of foaming of the adhesive occurs. In any event, little or no difficulty is experienced with the adhesive flowing downwardly in, or dripping from, the trough. The capsules are generally formed in sections of convenient length, e.g., 4 to 6 feet, and as many as necessary are used to form a joint longer than this, the capsules being inserted with their ends abutting one another.

FIGURE 13 illustrates an intermediate stage in the joint formation with the capsule properly arranged with respect to the channel 48 and with the partially foamed adhesive 56 protruding to some extent from the open side of the trough and beginning to fill the channel 48. As the foaming action proceeds a certain amount of heat is developed within the body of the adhesive and this causes the foaming action to proceed more rapidly. It will be noted that in the arrangement of FIGURE 13 there is no possibility of the foaming adhesive coming into contact with the surface of a noninsulating material since the elements 44 and 45 and the entire capsule including the elements 41 and 42, are made of insulating materials, usually of foamed polystyrene or of other foamed resinous composition. Under such conditions no difficulty whatsoever is experienced, provided sufficient adhesive has been employed, in the filling of the channel 48 completely and rapidly with foamed and hardened adhesive composition firmly bonded to all the surfaces defining the channel in the manner illustrated in FIGURE 14.

To provide for the maximum area of adherence of the foamed adhesive to the facing surfaces 54 and 55, it is preferred that the trough side members 42 converge toward one another in the way which has been described previously. They should, of course, be integral with the trough bottom member 41 at points spaced from one another at a distance not greater than, and preferably somewhat less than, the width of the channel 48 in the manner illustrated in FIGURES 13 and 14. With this configuration of the capsule ample opportunity is afforded for the foaming adhesive to flow into the roughly prismatically shaped sections 57 of the channel 48 which lie between the facing surfaces 54 or 55 and the outer surface of the adjacent trough side members 42. Also, the distance the trough side members 42 protrude vertically from the bottom member 41 should be less than the depth of the channel to avoid their contacting the wall of the channel opposite its open side so as to prevent the foaming adhesive from expanding fully into all sections of the channel. With this preferred configuration of the capsule, the surfaces 54 and 55 and the outer surfaces of the members 42 become bonded to the foamed and hardened adhesive 58 over virtually their entire extents in the manner illustrated in FIGURE 14. In this way a bond of maximum strength is formed. It will be noted that the same effect can be obtained, although not so conveniently, by forming the facing surfaces defining the channel so that they diverge from one another away from the open side of the channel, in which case the trough side members 42 can be formed to extend normally with respect to the bottom member 41.

As indicated previously it is desirable that enough foam-forming adhesive be charged into the trough of the capsule to produce a joint in which the channel 48, as well as the trough itself, is filled completely with the foamed and hardened adhesive composition. It is difficult to charge the capsule with precisely the correct amount of foam-forming adhesive composition to accomplish this purpose and, generally speaking, it is found in practice that better results are obtained if slightly more than this amount of composition is charged into the capsule. Under such conditions a slight amount of pressure will develop within the channel 48 during the latter stages of the foaming operation and this may tend to push the capsule out of the channel 48. To avoid this possibility, it has sometimes been found convenient, as illustrated in FIGURE 13, to pin the edge section members 53 of the trough bottom member 41 to the adjacent surfaces of the members 44 and 45 with pins of any convenient sort. As shown in FIGURE 13 conventional ice picks have on occasion been employed as pins with entire satisfaction. These are spaced at convenient intervals, e.g. at intervals of roughly one foot, alternately along the capsule and are preferably inserted at an angle somewhat as shown in FIGURE 13, to provide maximum holding power. Under such conditions little or no tendency for the capsule to be pushed out of the channel 48 by the foaming adhesive is encountered unless the channel trough is grossly overloaded with foam-forming adhesive composition. For economic reasons this latter condition should be avoided. The increase in density of the foamed and hardened resinous composition due to its confinement within the channel 48 during the latter stages of the foaming operation in the way described is insignificant and of no noticeable effect insofar as change in the insulating value of the foamed and hardened composition is concerned. Any other suitable means for retaining the capsule in place can, of course, be employed when desirable or necessary.

Following the assembling of the insulating elements 44 and 45 and the capsule in the way which has been described, the assemblage is left undisturbed until the foaming action has proceeded essentially to its completion, at which time the hardening action of the adhesive will have proceeded to a point where the foamed composition is entirely form-sustaining and will undergo essentially no further dimensional change even though it may harden more. When this stage is reached, usually after from about five minutes to a half hour, or longer, the pins 43 can be removed, the holes remaining being entirely insignificant when suitably slender pins are used. It will thus be seen that in the joint thus formed there is a continuous layer of material of high heat insulating value extending entirely across the region of the joint and that the joint itself is strong and rigid entirely across the region. There are no paths of high heat conductivity extending in any direction across the joint.

In FIGURE 15 there is shown a joint similar in many respects to the joint of FIGURE 14, but employing certain minor alternative arrangements of the parts. In this instance the channel 48 is formed by rabbeting, as before, except that only the insulating element 61 is rabbeted with the extension 52 of this element extending across the entire bottom of the channel. This procedure involves only one rabbeting operation rather than two such operations. In this instance, also, the capsule is formed without the edge section members 53 and with the trough bottom member 41 being dimensioned to fit snugly within the open side of the channel 48, the member 41 as well as the members 42, being inserted into the channel. During foaming of the adhesive the capsule can in this instance be retained in the channel in any convenient way, as by the use of pins corresponding to the pins 43 of FIGURE 14, or by the use of a length of adhesive tape, such as the tape 35 of FIGURE 8, or in any other convenient way. The modification of FIGURE 15 is generally preferred when a plane surface across the region of the joint is desired. Generally speaking, the modification of FIGURE 15 includes the principal advantages of the modification of FIGURE 14.

I claim:

1. The method for joining heat-insulating elements which includes:
positioning a pair of heat-insulating elements with facing surfaces defining a channel with an open side and of predetermined dimensions between the surfaces;
providing an elongated capsule made of a heat-insulating material comprising a troughlike capsule body adapted to contain a quantity of a synthetic foam-forming, hardenable, resinous adhesive composition, and having dimensions adapting it to be inserted at least partially into the channel between the facing surfaces;
charged the capsule body by distributing therein a suitable quantity of a synthetic, foam-forming, hardenable, resinous adhesive composition;
inserting the capsule body with the foam-forming adhesive composition therein at least partially into the open side of the channel between the facing surfaces to position the foaming adhesive composition and the inserted parts of the capsule within the channel;
and causing the adhesive composition to complete its foaming action within the channel to essentially fill the part of the channel unoccupied by the inserted part of the capsule body with the foamed and hardened adhesive composition whereby the pair of insulating elements, the inserted part of the capsule body and the foamed and hardened adhesive composition become bonded together as a rigid, heat-insulating structure extending across the region of the joint.

2. The method as claimed in claim 1 wherein the width of the channel between the facing surfaces of the insulating elements and the dimensions of the capsule body are related to provide for essentially complete closing of the open side of the channel when the capsule body is inserted at least partially into the channel.

3. The method as claimed in claim 1 wherein the pair of insulating elements and the capsule body are each made of a foamed, synthetic resinous composition.

4. The method as claimed in claim 1 wherein the channel between the facing surfaces extends from its open side for a distance less than the thickness of the insulating elements and is closed at its opposite side by an extension of at least one of the elements which abuts the other element.

5. The method as claimed in claim 1 wherein the troughlike capsule body includes a pair of trough side members, each integral along one of its edges with, and projecting away from, a trough bottom member, the capsule body members being contoured and dimensioned with respect to the channel between the facing surfaces of the insulating elements to provide a space between each trough side member and the adjacent facing surface of the channel when the trough side members are inserted into the channel into which the adhesive can flow during the foaming action to provide a bond between the surface of the trough side member and the section of the facing surface of the channel immediately adjacent to the member.

6. The method as claimed in claim 5 wherein the trough side members of the capsule body converge toward one another in a direction away from the trough bottom member, but are separate from one another along their projecting edges.

7. The method as claimed in claim 1 wherein the pair of heat-insulating elements are positioned on and secured to a surface which is being insulated.

8. The method for installing an adherent continuous layer of heat-insulating material on a preformed surface of a structure which includes:
securing a pair of heat-insulating elements to the preformed surface, at least one of the elements being rabbeted to provide a surface facing, but removed from, a facing surface of the other element with the facing surfaces defining a channel between them which is open along its side removed from the preformed surface and is closed along its opposite side nearest the preformed surface by a projecting portion of the rabbeted element which abuts the other element;
providing an elongated capsule made of a heat-insulating material comprising a troughlike capsule body adapted to contain a quantity of a synthetic, foam-forming, hardenable, resinous adhesive composition which includes a trough bottom member and a pair of trough side members each integral along one of its edges with the trough bottom member and each projecting away from the trough bottom member on the same side thereof as the other trough side member and converging away from the trough bottom member toward the other trough side member with the projecting edges of the trough side members being removed from one another by a suitable distance;
charging the capsule body by distributing in the trough thereof a suitable quantity of a synthetic, foam-forming, hardenable, resinous adhesive composition;
inserting the capsule body with the foaming adhesive composition therein with the projecting edges of the trough side members forward into the open side of the channel between the facing surfaces of the insulating elements to position the foaming adhesive composition and the trough side members essentially entirely within the channel, the trough side members projecting from the trough bottom member insufficiently far to extend entirely through the channel and being spaced from one another by a distance sufficiently small to leave a space between each trough side member and the adjacent section of the adjacent facing surface into which the foaming adhesive can flow, and the trough bottom member being sufficiently wide to cause it to close essentially completely the open side of the channel whereby the foaming adhesive is prevented from flowing out of the channel during the foaming action;
and causing the adhesive composition to complete its foaming action within the channel and to fill the part of the channel unoccupied by the inserted part of the capsule body with the foamed and hardened adhesive composition whereby the pair of insulating elements, the inserted part of the capsule body and the foamed and hardened adhesive composition become bonded together in the form of a rigid continuous heat-insulating structure extending across the region of the joint and the preformed surface becomes insulated with a continuous adherent layer of heat-insulating material.

9. The method as claimed in claim 8 wherein the trough bottom member of the capsule provided is wider than the channel between the facing surfaces and overlaps in surface to surface contacting relationship the surfaces of the insulating elements when the trough side members are inserted into the channel.

10. The method as claimed in claim 8 wherein each trough side member of the body of the capsule provided converges away from the trough bottom member toward the other trough side member at an angle between about 5° and about 25° with respect to a plane normal to the trough bottom member.

11. The method for joining heat insulating elements which includes;
   positioning a pair of heat insulating elements to provide a channel of predetermined width between facing surfaces of the elements;
   providing a capsule comprising a cavity in a capsule body and an easily removable capsule cover, the capsule having a width adapting it to fit frictionally within the channel between the insulating elements;
   charging the capsule by distributing a predetermined amount of a synthetic foam-forming, hardenable, resinous adhesive composition in the capsule cavity and seating the capsule cover to enclose the composition substantially completely;
   inserting the charged capsule into the channel between the insulating elements to cause its sides to engage the facing walls of the elements frictionally;
   and leaving the thus-formed assemblage undisturbed until the foam-forming composition has foamed and hardened whereby the capsule cover becomes displaced from the capsule body and the channel becomes filled essentially completely in part with the capsule body and the capsule cover and in part with the foamed and hardened adhesive composition and whereby the capsule body, the capsule cover and the pair of insulating elements become bonded together by way of the foamed and hardened adhesive to provide a bonded structure having high heat insulating qualities extending across the region of the bond.

References Cited by the Examiner

UNITED STATES PATENTS

| 1,880,697 | 10/1932 | Beynon | 264—45 |
| 1,949,342 | 2/1934 | Weil | 50—137 |
| 2,170,254 | 8/1939 | Seil | 50—137 |
| 2,614,059 | 10/1952 | Cooper | 156—79 |
| 2,857,931 | 10/1958 | Lawton | 264—45 |
| 2,869,336 | 1/1959 | Smidt et al. | 62—405 |
| 2,910,730 | 11/1959 | Risch. | |
| 2,927,876 | 3/1960 | Hoppe et al. | 264—46 |
| 3,014,611 | 12/1961 | Marshall | 220—9 |
| 3,041,224 | 6/1962 | Sherts et al. | 156—79 |

FOREIGN PATENTS 238,858  5/1960  Australia.

ALEXANDER H. BRODMERKEL, *Primary Examiner.*

JAMES L. RIDGILL, PHILIP E. ANDERSON, *Assistant Examiners.*